United States Patent
Walker

(10) Patent No.: US 10,459,101 B2
(45) Date of Patent: Oct. 29, 2019

(54) METHOD FOR NEAR-REAL-TIME, HIGH-RESOLUTIONSIGNAL FILTERING IN NOISY ENVIRONMENTS

(71) Applicant: Halliburton Energy Services, Inc., Houston, TX (US)

(72) Inventor: Kristoffer Thomas Walker, Kingwood, TX (US)

(73) Assignee: Halliburton Energy Services, Inc., Houston, TX (US)

(*) Notice: Subject to any disclaimer, the term of this patent is extended or adjusted under 35 U.S.C. 154(b) by 19 days.

(21) Appl. No.: 15/594,409

(22) Filed: May 12, 2017

(65) Prior Publication Data

US 2017/0343693 A1 Nov. 30, 2017

Related U.S. Application Data

(60) Provisional application No. 62/341,506, filed on May 25, 2016.

(51) Int. Cl.
| | |
|---|---|
| *G01V 1/48* | (2006.01) |
| *E21B 47/12* | (2012.01) |
| *E21B 49/00* | (2006.01) |
| *G01V 1/36* | (2006.01) |

(52) U.S. Cl.
CPC ............. *G01V 1/48* (2013.01); *E21B 47/12* (2013.01); *E21B 49/00* (2013.01); *G01V 1/364* (2013.01); *G01V 2200/16* (2013.01); *G01V 2210/121* (2013.01); *G01V 2210/1299* (2013.01); *G01V 2210/1429* (2013.01); *G01V 2210/23* (2013.01); *G01V 2210/324* (2013.01); *G01V 2210/6222* (2013.01); *G01V 2210/72* (2013.01)

(58) Field of Classification Search
CPC ...... G01V 1/48; G01V 2210/23; G01V 1/364; G01V 2210/121; G01V 2210/6222; G01V 2210/72; G01V 2210/1429; G01V 2200/16; G01V 2210/324; G01V 2210/1299; E21B 49/00; E21B 47/12
USPC .......................................................... 367/26
See application file for complete search history.

(56) References Cited

U.S. PATENT DOCUMENTS

| | | | |
|---|---|---|---|
| 7,908,086 B2 * | 3/2011 | Bergery | G01V 1/364 |
| | | | 702/14 |
| 2017/0031047 A1 * | 2/2017 | Cheng | G01V 1/325 |

FOREIGN PATENT DOCUMENTS

| | | |
|---|---|---|
| WO | 2016039928 | 3/2016 |
| WO | 2016123432 | 8/2016 |
| WO | 2016123436 | 8/2016 |

* cited by examiner

*Primary Examiner* — Daniel L Murphy
(74) *Attorney, Agent, or Firm* — Benjamin Fite; C. Tumey Law Group PLLC

(57) ABSTRACT

Systems and methods for downhole signal filtering. A method for downhole signal filtering may comprise defining outliers as isolated values; providing thresholds; determining the outliers from a buffer; computing a difference in slowness between adjacent pairs of values; comparing the adjacent pairs of values to other values in a same window; determining if the adjacent pairs of values vary more than the threshold; assigning a 2D flag array a value of 0 if the adjacent pairs of values vary more than the threshold; and computing a 75% percentile distribution for each adjacent pair of values to determine if each adjacent pair of values are the outliers.

20 Claims, 10 Drawing Sheets

Slowness

Slowness

Slowness

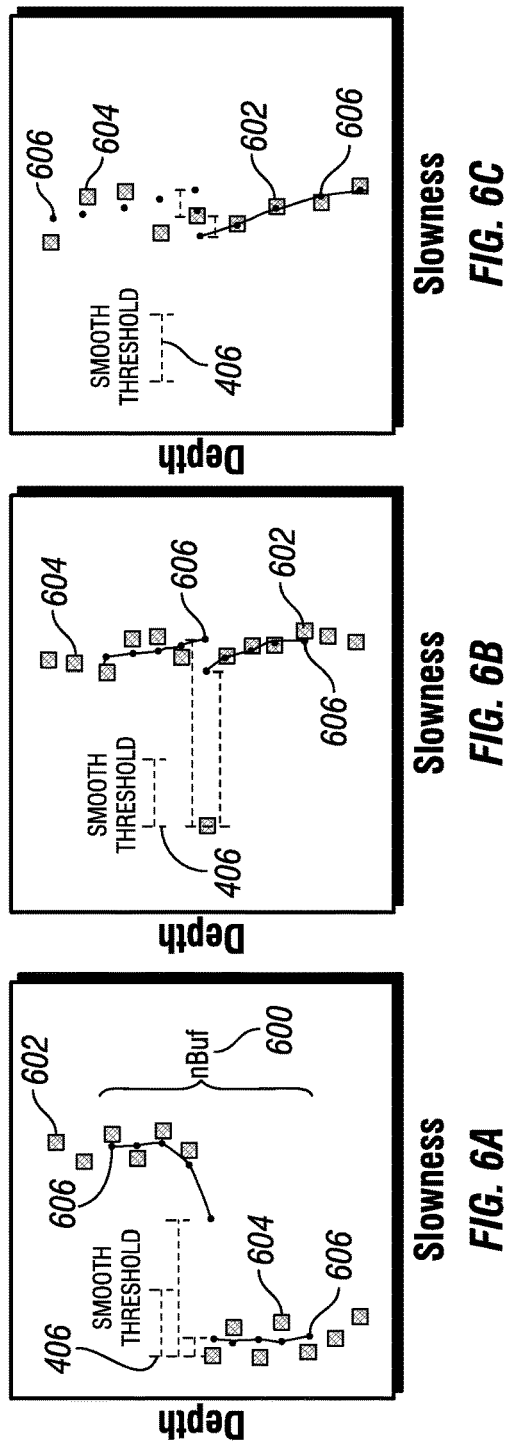

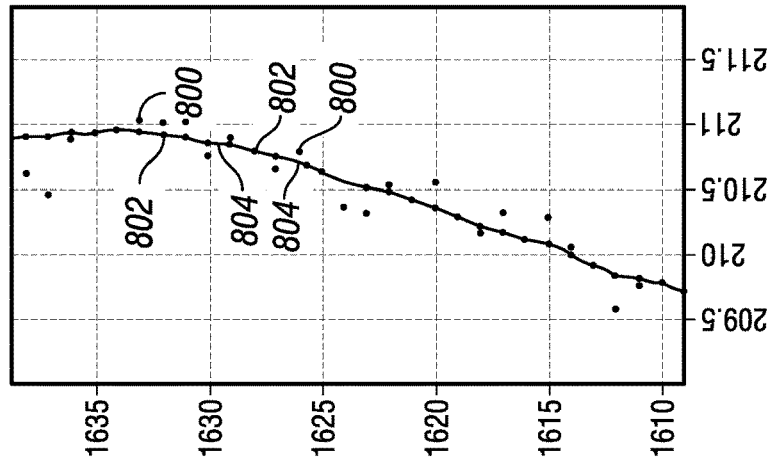
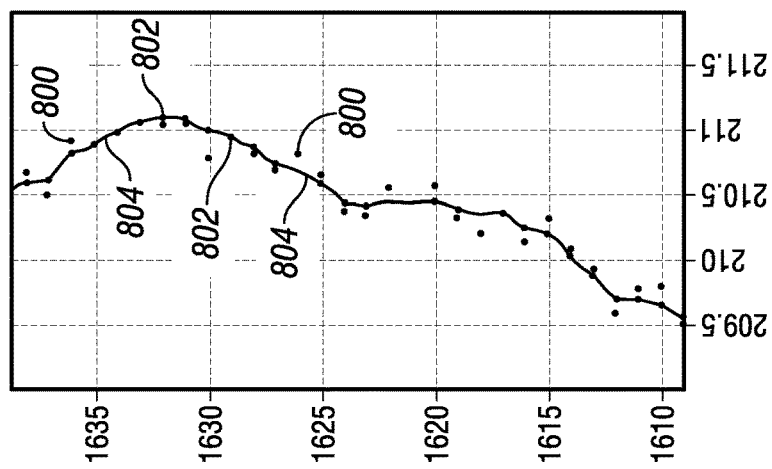
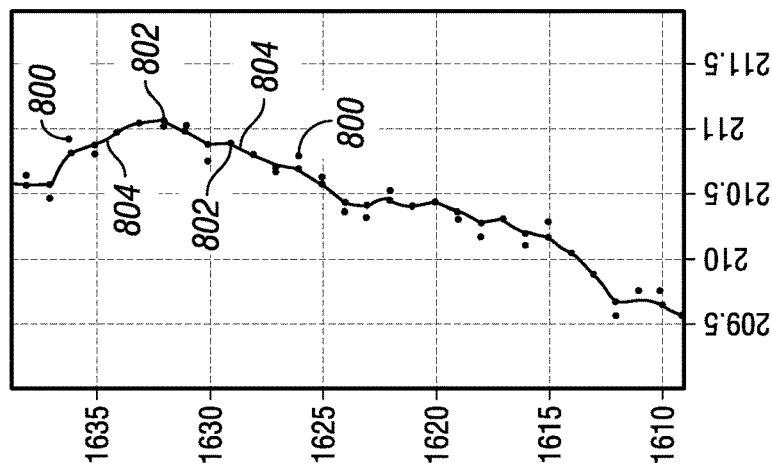

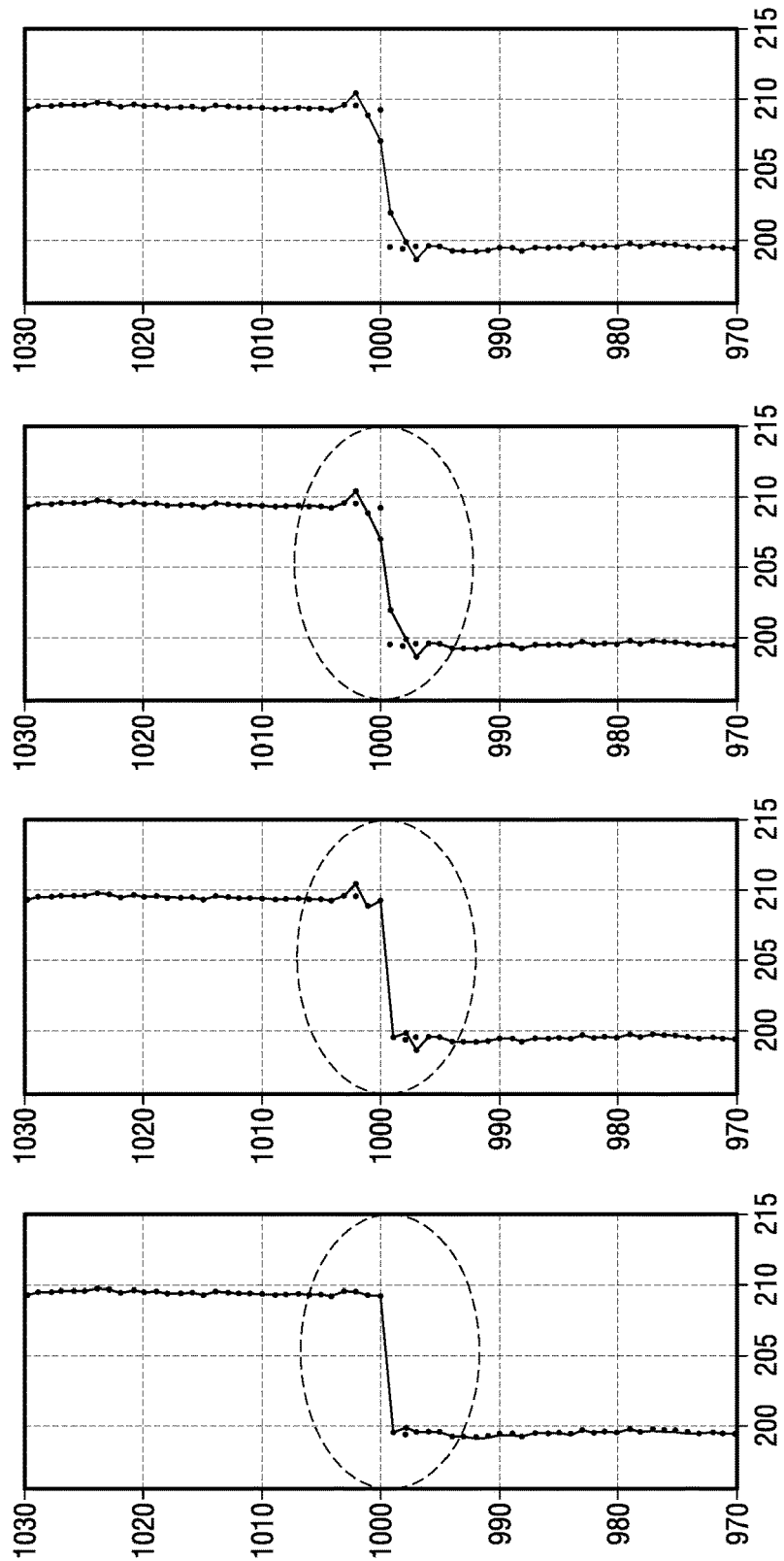

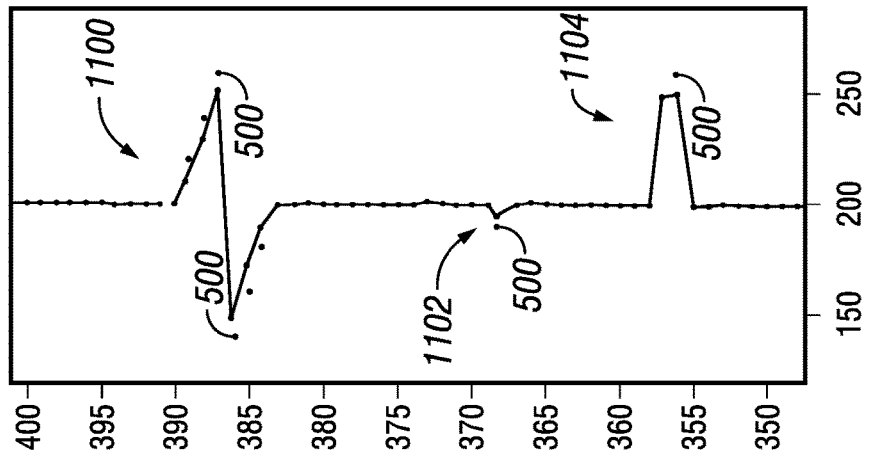
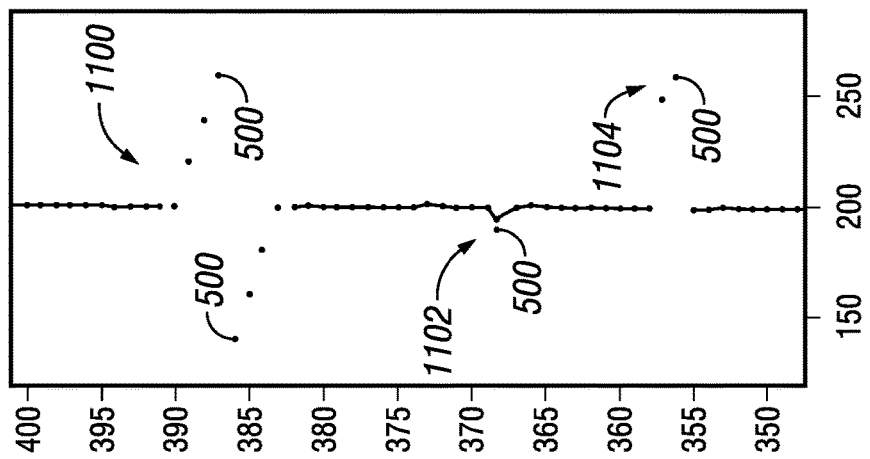
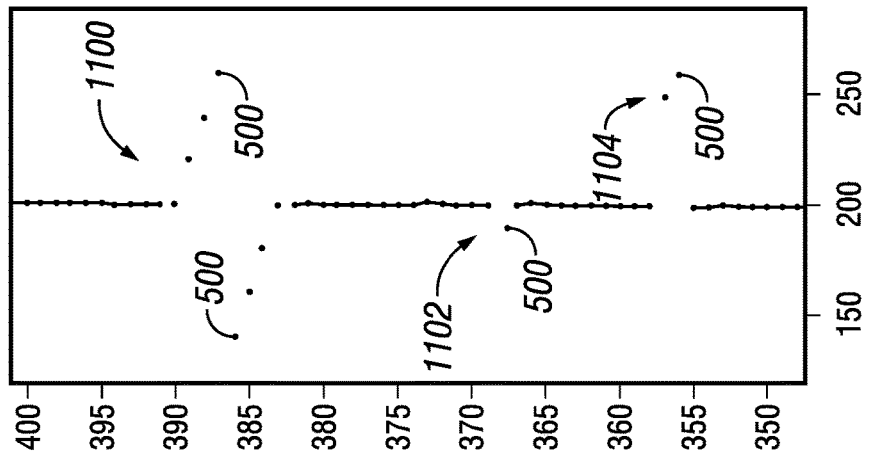

METHOD FOR NEAR-REAL-TIME, HIGH-RESOLUTION SIGNAL FILTERING IN NOISY ENVIRONMENTS

BACKGROUND

Acoustic waveform processing may be frequently used to estimate properties of a geological formation. Acoustic waveform data may be collected using an acoustic logging tool. Measurements may be repeated every few inches as the tool is drawn up (or down) the borehole. The acoustic signal from the acoustic source may travel through the subterranean formation adjacent to the borehole to the acoustic logging tool. The arrival times and other characteristics of the received signals may be recorded. Typically, compressional wave (P-wave), shear wave (S-wave), and Stoneley wave arrivals may be observed by the acoustic logging tool and may be processed into an acoustic waveform data format. The acoustic waveform data may be processed to determine other formation characteristics such as formation slowness (which may be the inverse of acoustic speed), from which formation strength, porosity, and other formation properties may be estimated. Many different techniques are known in the art for processing the acoustic waveform data in order to obtain information regarding the borehole, the formation, or both. Typically, the processing may involve digitizing the received signals at a desired sampling rate and then processing the digitized samples according to desired techniques.

BRIEF DESCRIPTION OF THE DRAWINGS

These drawings illustrate certain aspects of some examples of the present disclosure, and should not be used to limit or define the disclosure.

FIGS. 6A-6C illustrate smoothing;

FIGS. 8A-8C illustrate an effect of a length of a buffer window on filtered values;

FIGS. 10A-10D illustrate an effect of a jitter rejection tolerance parameter on filtered values;

FIGS. 11A-11C illustrate an effect of an outlier rejection parameter on filtered values.

DETAILED DESCRIPTION

This disclosure may generally relate to systems and methods for real-time, adaptive filtering that recognizes and preserves signals with sharp features (high frequency or wavenumber) while removing incoherent variations (noise) in the data series. The systems and methods may be used in a near-real-time environment, and may use information about the future, as well as the past, to make a decision about how to proceed. Systems and methods of the present disclosure may be applied to a number of different problems associated with borehole logging measurements.

There are many near-real-time applications where it may be desired to filter signal out of a series of data points that includes noise. The ideal filter removes all of the noise and preserves all of the signal. Many real-time filtering solutions remove both signal and noise, and the challenge is to optimize or tune the filter to remove more noise than signal. This may be a challenge because the environment in which the data and noise are created may sometimes change, requiring tuning processes for all possible environments.

Figure 1:
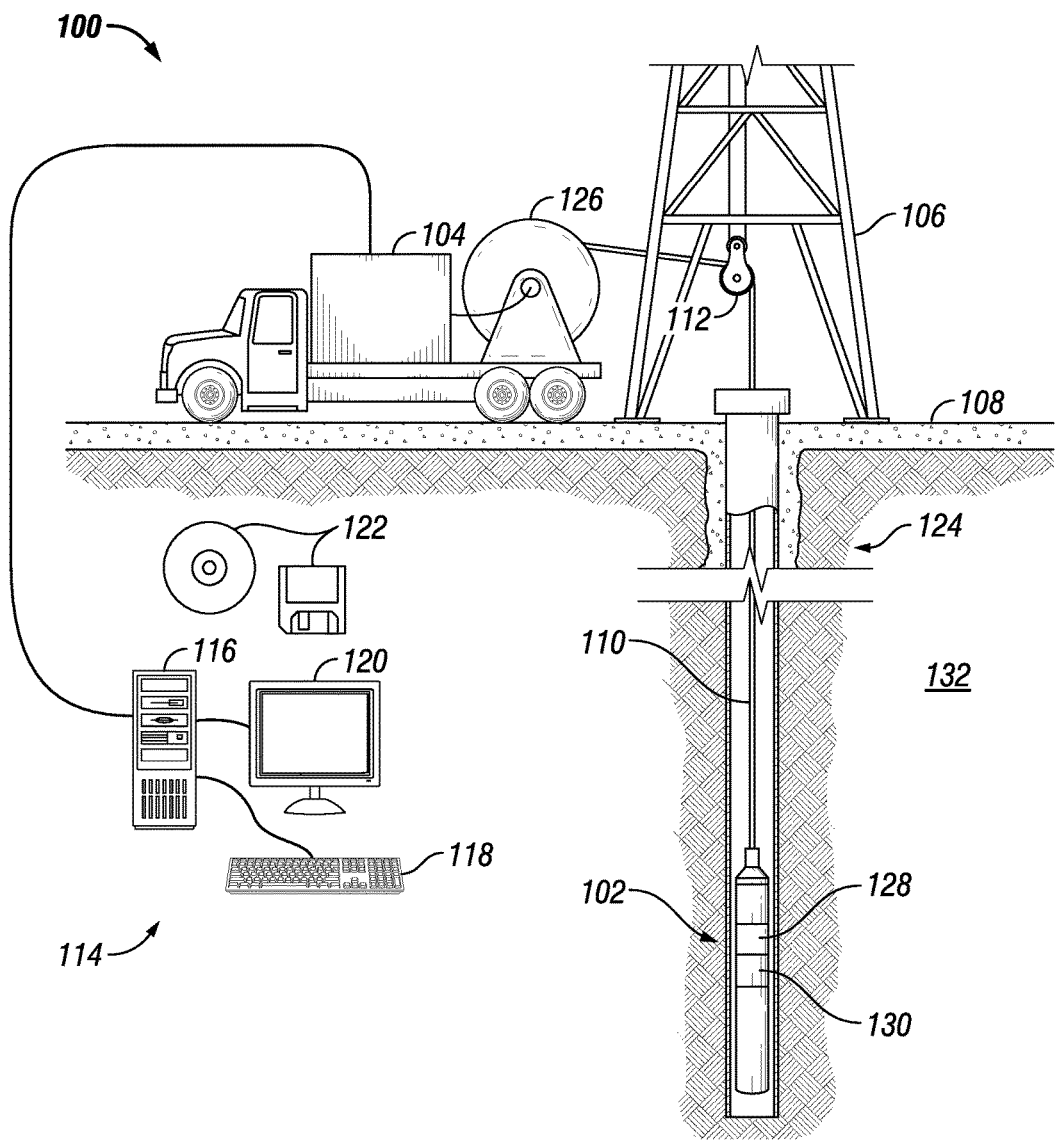
FIG. 1 illustrate an example of a well measurement system.

FIG. 1 illustrates a cross-sectional view of a well measurement system 100. As illustrated, well measurement system 100 may comprise downhole tool 102 attached a vehicle 104. In examples, it should be noted that downhole tool 102 may not be attached to a vehicle 104. Downhole tool 102 may be supported by rig 106 at surface 108. Downhole tool 102 may be tethered to vehicle 104 through conveyance 110. Conveyance 110 may be disposed around one or more sheave wheels 112 to vehicle 104. Conveyance 110 may include any suitable means for providing mechanical conveyance for downhole tool 102, including, but not limited to, wireline, slickline, coiled tubing, pipe, drill pipe, downhole tractor, or the like. In some embodiments, conveyance 110 may provide mechanical suspension, as well as electrical connectivity, for downhole tool 102. Conveyance 110 may comprise, in some instances, a plurality of electrical conductors extending from vehicle 104. Conveyance 110 may comprise an inner core of seven electrical conductors covered by an insulating wrap. An inner and outer steel armor sheath may be wrapped in a helix in opposite directions around the conductors. The electrical conductors may be used for communicating power and telemetry between vehicle 104 and downhole tool 102. Information from downhole tool 102 may be gathered and/or processed by information handling system 114. For example, signals recorded by downhole tool 102 may be stored on memory and then processed by downhole tool 102. The processing may be performed real-time during data acquisition or after recovery of downhole tool 102. Processing may alternatively occur downhole or may occur both downhole and at surface. In some embodiments, signals recorded by downhole tool 102 may be conducted to information handling system 114 by way of conveyance 110. Information handling system 114 may process the signals, and the information contained therein may be displayed for an operator to observe and stored for future processing and reference. Information handling system 114 may also contain an apparatus for supplying control signals and power to downhole tool 102.

Systems and methods of the present disclosure may be implemented, at least in part, with information handling system 114. Information handling system 114 may include any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, an information handling system 114 may be a processing unit 116, a network storage device, or any other suitable device and may vary in size, shape, performance, functionality, and price. Information handling system 114 may include random access memory (RAM), one or more processing resources such as a central processing unit (CPU) or hardware or software control logic, ROM, and/or other types of nonvolatile memory. Additional components of the information handling system 114 may include one or more disk drives, one or more network ports for communication with external devices as well as an input device 118 (e.g., keyboard, mouse, etc.) and video display 120. Information handling system 114 may also include one or more buses operable to transmit communications between the various hardware components.

Alternatively, systems and methods of the present disclosure may be implemented, at least in part, with non-transitory computer-readable media 122. Non-transitory computer-readable media 122 may include any instrumentality or aggregation of instrumentalities that may retain data and/or instructions for a period of time. Non-transitory computer-readable media 122 may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

In examples, rig 106 includes a load cell (not shown) which may determine the amount of pull on conveyance 110 at the surface of borehole 124. Information handling system 114 may comprise a safety valve which controls the hydraulic pressure that drives drum 126 on vehicle 104 which may reels up and/or release conveyance 110 which may move downhole tool 102 up and/or down borehole 124. The safety valve may be adjusted to a pressure such that drum 126 may only impart a small amount of tension to conveyance 110 over and above the tension necessary to retrieve conveyance 110 and/or downhole tool 102 from borehole 124. The safety valve is typically set a few hundred pounds above the amount of desired safe pull on conveyance 110 such that once that limit is exceeded; further pull on conveyance 110 may be prevented.

Downhole tool 102 may comprise a transmitter 128 and/or a receiver 130. In examples, downhole tool 102 may operate with additional equipment (not illustrated) on surface 108 and/or disposed in a separate well measurement system (not illustrated) to record measurements and/or values from formation 132. During operations, transmitter 128 may broadcast a signal from downhole tool 102. Transmitter 128 may be connected to information handling system 114, which may further control the operation of transmitter 128. Additionally, receiver 130 may measure and/or record signals broadcasted from transmitter 128. Receiver 130 may transfer recorded information to information handling system 114. Information handling system 114 may control the operation of receiver 130. For example, the broadcasted signal from transmitter 128 may be reflected by formation 132. The reflected signal may be recorded by receiver 130. The recorded signal may be transferred to information handling system 114 for further processing. In examples, there may be any suitable number of transmitters 128 and/or receivers 130, which may be controlled by information handling system 114. Information and/or measurements may be processed further by information handling system 114 to determine properties of borehole 124, fluids, and/or formation 132.

Figure 2:
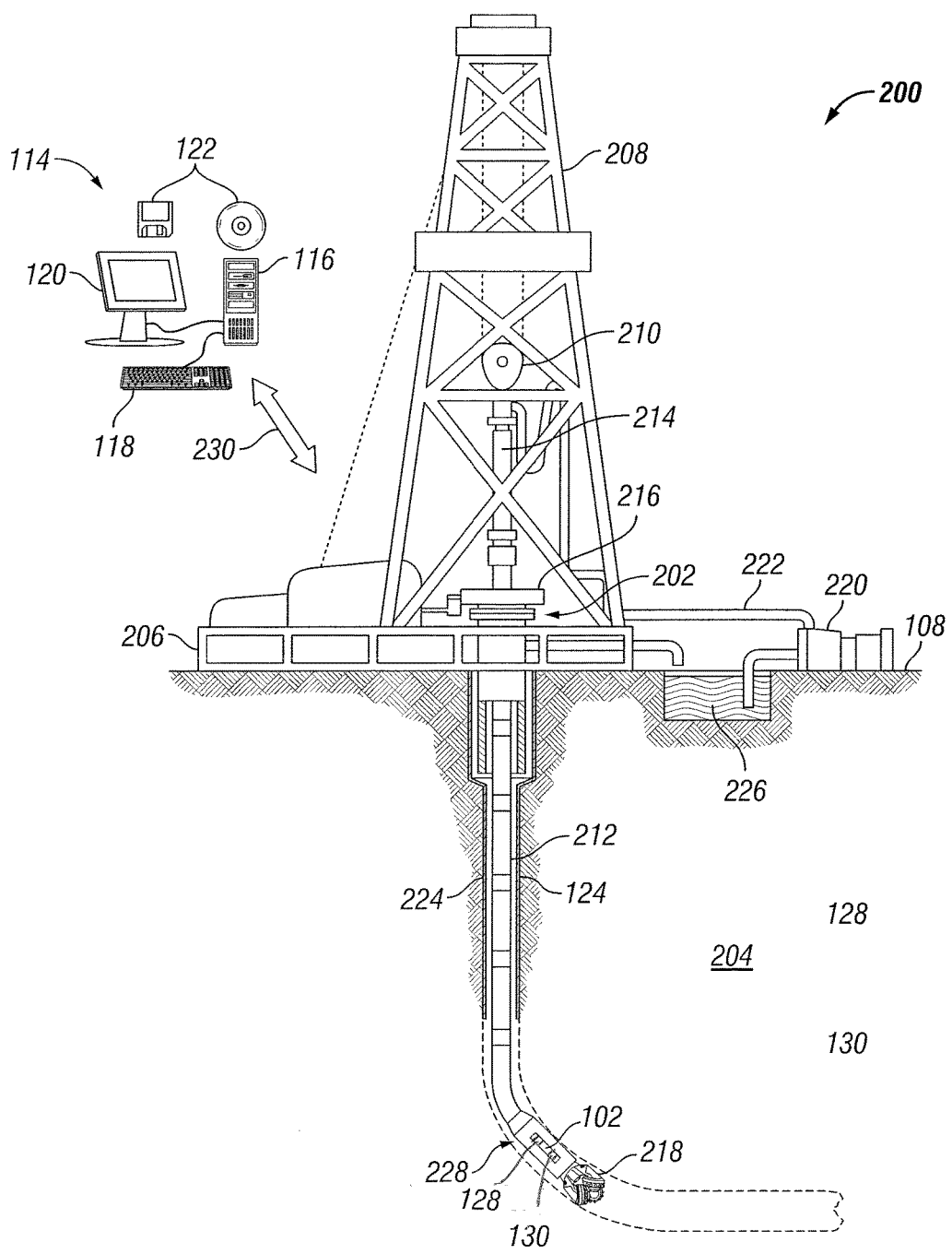
FIG. 2 illustrates another example of a well measurement system.

FIG. 2 illustrates an example in which downhole tool 102 (Referring to FIG. 1) may be disposed in a drilling system 200. As illustrated, borehole 124 may extend from a wellhead 202 into a subterranean formation 204 from surface 108 (Referring to FIG. 1). Generally, borehole 124 may include horizontal, vertical, slanted, curved, and other types of wellbore geometries and orientations. Borehole 124 may be cased or uncased. In examples, borehole 124 may comprise a metallic material. By way of example, the metallic member may be a casing, liner, tubing, or other elongated steel tubular disposed in borehole 124.

As illustrated, borehole 124 may extend through subterranean formation 204. As illustrated in FIG. 2, borehole 124 may extending generally vertically into the subterranean formation 204, however borehole 124 may extend at an angle through subterranean formation 204, such as horizontal and slanted wellbores. For example, although FIG. 2 illustrates a vertical or low inclination angle well, high inclination angle or horizontal placement of the well and equipment may be possible. It should further be noted that while FIG. 2 generally depicts a land-based operation, those skilled in the art may recognize that the principles described herein are equally applicable to subsea operations that employ floating or sea-based platforms and rigs, without departing from the scope of the disclosure.

As illustrated, a drilling platform 206 may support a derrick 208 having a traveling block 210 for raising and lowering drill string 212. Drill string 212 may include, but is not limited to, drill pipe and coiled tubing, as generally known to those skilled in the art. A kelly 214 may support drill string 212 as it may be lowered through a rotary table 216. A drill bit 218 may be attached to the distal end of drill string 212 and may be driven either by a downhole motor and/or via rotation of drill string 212 from surface 108. Without limitation, drill bit 218 may include, roller cone bits, PDC bits, natural diamond bits, any hole openers, reamers, coring bits, and the like. As drill bit 218 rotates, it may create and extend borehole 124 that penetrates various subterranean formations 204. A pump 220 may circulate drilling fluid through a feed pipe 222 to kelly 214, downhole through interior of drill string 212, through orifices in drill bit 218, back to surface 108 via annulus 224 surrounding drill string 212, and into a retention pit 226.

With continued reference to FIG. 2, drill string 212 may begin at wellhead 202 and may traverse borehole 124. Drill bit 218 may be attached to a distal end of drill string 212 and may be driven, for example, either by a downhole motor and/or via rotation of drill string 212 from surface 108 (Referring to FIG. 1). Drill bit 218 may be a part of bottom hole assembly 228 at distal end of drill string 212. Bottom hole assembly 228 may further comprise downhole tool 102 (Referring to FIG. 1). Downhole tool 102 may be disposed on the outside and/or within bottom hole assembly 228. Downhole tool 102 may comprise a plurality of transmitters 128 and receivers 130 (Referring to FIG. 1). Downhole tool 102 and/or the plurality of transmitters 128 and receivers 130 may operate and/or function as described above. As will be appreciated by those of ordinary skill in the art, bottom hole assembly 228 may be a measurement-while drilling (MWD) or logging-while-drilling (LWD) system.

Without limitation, bottom hole assembly 228, transmitter 128, and/or receiver 130 may be connected to and/or controlled by information handling system 114 (Referring to FIG. 1), which may be disposed on surface 108. Without limitation, information handling system 114 may be disposed down hole in bottom hole assembly 228. Processing of information recorded may occur down hole and/or on surface 108. Processing occurring downhole may be transmitted to surface 108 to be recorded, observed, and/or further analyzed. Additionally, information recorded on information handling system 114 that may be disposed down hole may be stored until bottom hole assembly 228 may be brought to surface 108. In examples, information handling system 114 may communicate with bottom hole assembly 228 through a communication line (not illustrated) disposed in (or on) drill string 212. In examples, wireless communication may be used to transmit information back and forth between information handling system 114 and bottom hole assembly 228. Information handling system 114 may transmit information to bottom hole assembly 228 and may receive as well as process information recorded by bottom hole assembly 228. In examples, a downhole information handling system (not illustrated) may include, without limitation, a microprocessor or other suitable circuitry, for estimating, receiving and processing signals from bottom hole assembly 228. Downhole information handling system (not illustrated) may further include additional components, such as memory, input/output devices, interfaces, and the like. In examples, while not illustrated, bottom hole assembly 228 may include one or more additional components, such as analog-to-digital converter, filter and amplifier, among others, that may be used to process the measurements of bottom hole assembly 228 before they may be transmitted to surface 108. Alternatively, raw measurements from bottom hole assembly 228 may be transmitted to surface 108.

Any suitable technique may be used for transmitting signals from bottom hole assembly 228 to surface 108, including, but not limited to, wired pipe telemetry, mud-pulse telemetry, acoustic telemetry, and electromagnetic telemetry. While not illustrated, bottom hole assembly 228 may include a telemetry subassembly that may transmit telemetry data to surface 108. Without limitation, an electromagnetic source in the telemetry subassembly may be operable to generate pressure pulses in the drilling fluid that propagate along the fluid stream to surface 108. At surface 108, pressure transducers (not shown) may convert the pressure signal into electrical signals for a digitizer (not illustrated). The digitizer may supply a digital form of the telemetry signals to information handling system 114 via a communication link 230, which may be a wired or wireless link. The telemetry data may be analyzed and processed by information handling system 114.

As illustrated, communication link 230 (which may be wired or wireless, for example) may be provided that may transmit data from bottom hole assembly 228 to an information handling system 114 at surface 108. Information handling system 114 may include a processing unit 116 (Referring to FIG. 1), a video display 120 (Referring to FIG. 1), an input device 118 (e.g., keyboard, mouse, etc.) (Referring to FIG. 1), and/or non-transitory computer-readable media 122 (e.g., optical disks, magnetic disks) (Referring to FIG. 1) that may store code representative of the methods described herein. In addition to, or in place of processing at surface 108, processing may occur downhole.

Bottom hole assembly 228 may comprise a transmitter 128 and/or a receiver 130. In examples, bottom hole assembly 228 may operate with additional equipment (not illustrated) on surface 108 and/or disposed in a separate well measurement system (not illustrated) to record measurements and/or values from subterranean formation 204. During operations, transmitter 128 may broadcast a signal from bottom hole assembly 228. Transmitter 128 may be connected to information handling system 114, which may further control the operation of transmitter 128. Additionally, receiver 130 may measure and/or record signals broadcasted from transmitter 128. Receiver 130 may transfer recorded information to information handling system 114.

Information handling system 114 may control the operation of receiver 130. For example, the broadcasted signal from transmitter 128 may be reflected by subterranean formation 204. The reflected signal may be recorded by receiver 130. The recorded signal may be transferred to information handling system 114 for further processing. In examples, there may be any suitable number of transmitters 128 and/or receivers 130, which may be controlled by information handling system 114. Information and/or measurements may be processed further by information handling system 114 to determine properties of borehole 124 (Referring to FIG. 1), fluids, and/or subterranean formation 204.

Figure 3:
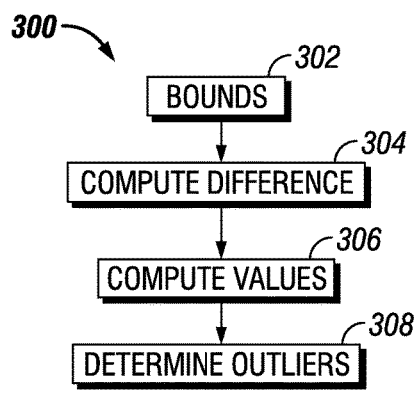
FIG. 3 illustrates an information handling system performing a method of outlier rejection through a series of steps.
Figure 4:
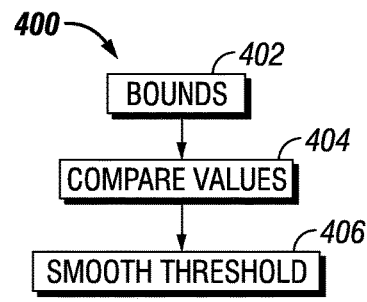
FIG. 4 illustrates an information handling system performing a method of outlier rejection through a series of steps.

Information handling system 114 may process recorded information by filtering out noise through outlier rejection 300 and/or jitter removal 400. Referring to FIGS. 3 and 4, information handling system 114 may perform a method of outlier rejection 300 through a series of steps. Outlier rejection 300 may define outliers as isolated values that may be offset away from coherent, relatively smaller variations in values. In other words, outlier rejection 300 identifies outliers using two fundamental assumptions. First, referring to FIG. 5, outliers 500 may be relatively far from trends (e.g. FIG. 5A). Second, outliers 500 may not be "coherent" with their neighboring values. For example, FIG. 5B shows an example of a group of values that are far away from the dominant trend of values. However, the value in the middle of that group is coherent with their neighboring values, and therefore is not considered an outlier.

Outlier rejection 300 represents a single depth at which that depth's value is evaluated for outlier rejection and/or modified for jitter removal. Outlier rejection 300 may be bounded 302 by a tolerance parameter (tolOutlier) and a window size (nBuf) that corresponds to a depth range of values where the center of the buffer is centered on the current depth. To determine which points in the buffer may be outliers 500 (referring to FIG. 5A), it may compute the difference 304 in slowness between adjacent pairs of values. Then it may compare 306 those values with all other values in the same window to determine if the values vary by more than a provided threshold, and if so, then assign a two dimensional flag array a value of 0. Determining if the value is an outlier 308 may comprise evaluating the 75% percentile distribution to determine if that value may be an outlier (if the percentile value is <1, then it is an outlier 308).

Unlike the subsequent jitter removal 400, discussed below, which uses a centered-buffer approach, outlier rejection 300 may be agnostic to the center of the data window (aka buffer). It may be designed to identify more than one outlier 500 (Referring to FIG. 5) within the current buffer window, which may be performed before using data points within that window to compute a filtered data series. The same result may not be achieved by running outlier rejection 300 alone on an entire data series first, and then taking that processed data series and feeding it into the filtering method. It should be noted that only outliers 500 that occur at the center of the buffer may be preserved as "final outliers" in the filtered output. Although not intended to be limiting, filtered output may not replace outliers 500 or missing input data values.

Figure 5A:
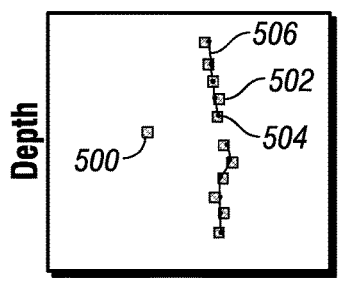
FIGS. 5A-5C illustrate sonic logging slowness values.
Figure 5B:
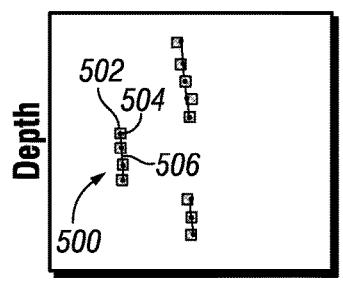

Although not intended to be limiting, FIGS. 5A, 5B and C illustrate outlier rejection 300 explained in the context of sonic logging "slowness" values, which may vary with depth; other logs such as time, frequency, amplitude, and signal-to-noise ratio may also benefit from outlier rejection. Boxes 502 may illustrate raw values. Black dots 504 may represent filtered values (via a subsequent process). Black line 506 connects black dots 504.

Jitter removal 400 may be an adaptive method that begins with bounds 402 determined by a tolerance value (tolSmooth) and the length of data window 600 (Referring to FIG. 6). It is a centered-buffer approach that works by splitting the window into two halves. Each half may be utilized to predict the value at the center of the buffer. Then, a comparison 404 of the observed and predicted values against a threshold as well as the comparison of the two different predictions may be used to determine what the filtered value may be. If the two predictions are within a predetermined threshold to each other (relative to the variation between adjacent samples in the buffer), then the average of the predictions is used. For example, with a predetermined threshold may be defined as each value is within 5 percent of each other. This yields a result that is very close to the result obtained by performing curve-fitting using the entire length of the data window. If the two predictions are significantly different from each other, but one of the predictions is close enough to the observation, that prediction may be used. This feature may permit sharp variations in signals to be preserved while still removing incoherent jitter.

If the two predictions are significantly different from each other, and the predictions are both far from the observation, then the observation may be flagged as an outlier. Alternatively, outlier rejection may be purely controlled by the preceding outlier rejection process, and the returned value may also be an average of the two predictions. Finally, Smooth Threshold 406 may be determined from the relative tolerance values.

FIGS. 6A, 6B, and 6C illustrate jitter removal 400, referring to FIG. 4. Boxes 602 illustrate raw values of the first half of the current data window 600 and boxes 604 illustrate raw values of the second half of the current data window 600. Data window 600 may be bound by the size determined by nBuf. The center of the buffer belongs to both sides of the buffer (nBuf is odd). Circles 606 are the smoothed filtered values. Circles 606 that have a thick outline may be the one that may be "selected" as the filtered value for the current data window (at the buffer center). Smooth Threshold 406 may be calculated from the relative tolerance value for jitter removal 400.

Figure 7:
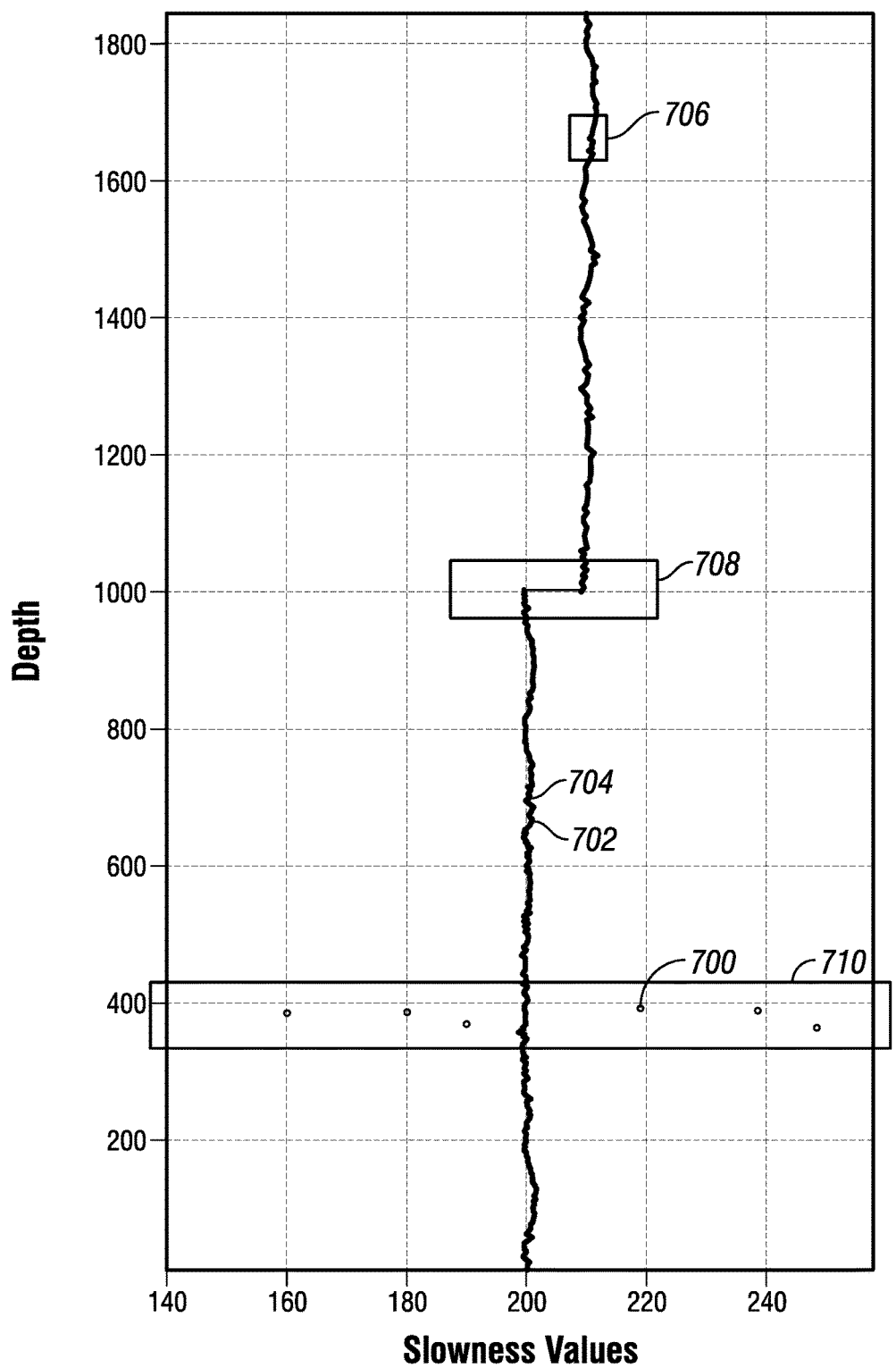
FIG. 7 illustrates synthetic raw values.

Utilization of outlier rejection 300 (Referring to FIG. 3) and jitter removal 400 (Referring to FIG. 4) may be illustrated in FIG. 7. A simulated wireline borehole acoustic log data series was created. Noise was added to this data series to reproduce the type of noise observed in measuring these types of data. The resulting data series is shown in FIG. 7. FIG. 7 illustrates synthetics showing synthetic raw values with filtered curve plotted on top. Circles 700 are the raw values. Circles 702 and curves 704 have been rejected as outliers.

First rectangle 706, second rectangle 708, and/or third rectangle 710 highlight areas demonstrating real-life data/noise complexity scenarios that are presented in FIGS. 8A-8C, 9, 10, and 11. First rectangle 706 shows normal signal and noise, where the noise may be in the form of incoherent "jitter," which may need to be removed. Second rectangle 708 shows a sharp jump of the signal from one baseline to another, which may be desired for preservation. Third rectangle 710 shows noise bursts as sudden offsets of values, circles 700, at progressively larger offsets, which may be desired for removal when their offsets may be large enough to be classified as outliers 500 (referring to FIG. 5).

First rectangle 706 is shown in FIGS. 8A-8C. FIGS. 8A-8C illustrates an effect of the length of the data window 600 (nBuf) (Referring to FIG. 6) on the filtered values. Circles 800 are the raw values. Circles 802 and curves 804 are filtered results. In FIG. 8A, nBuf=11. In FIG. 8B, nBuf=31. In FIG. 8C, nBuf=101. The signals are the long-wavelength variations. The short-wavelength variation may be due to random noise. The longer the window, the more "stiff" the resulting predictions from both halves of the buffer, utilizing jitter removal 400 (Referring to FIG. 4), which are being averaged together in this case, and the more reduction may occur for all types of variation (noise or signal).

Figure 9A:
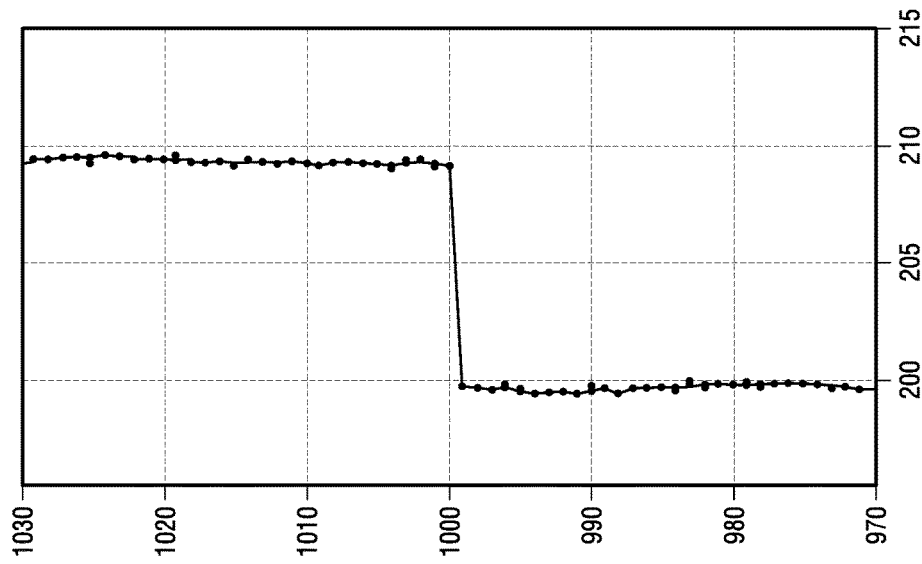
FIGS. 9A and 9B illustrate an effect of window length (nBuf) on preservation of sharp variations in signal in filtered values.
Figure 9B:
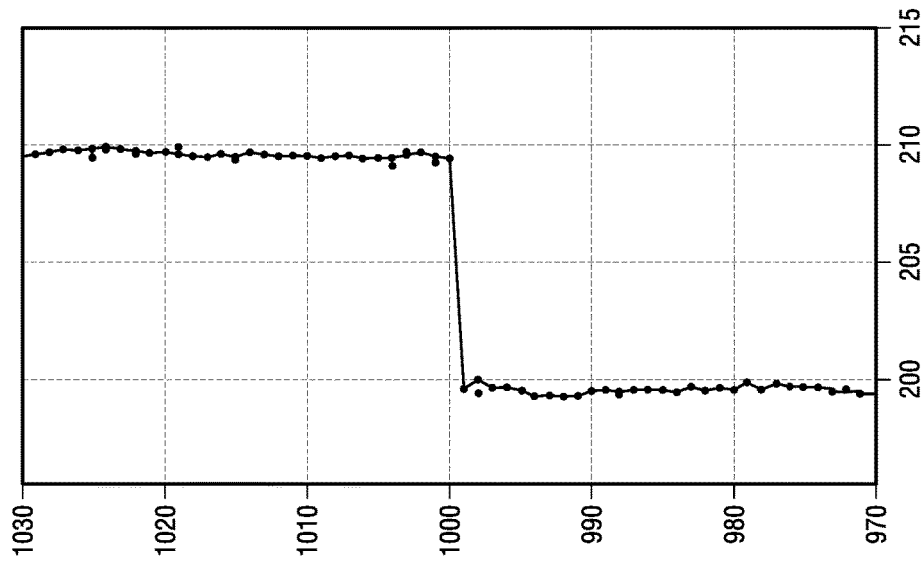

FIGS. 9A and 9B illustrate an effect of the window length (nBuf) on the preservation of a sharp variation in signal in the filtered values. This middle range shows a sudden jump from one signal baseline to another. In FIG. 9A, nBuf=11. In FIG. 9B, nBuf=31. This type of jump may be desirable to preserve. A typical FIR or IIR low-pass filter or a polynomial smoothing filter may smooth the values in FIGS. 5A-5B just the same, but those same filters may smooth through this jump. As the window size increases, the performance of outlier rejection 300 (Referring to FIG. 3) and jitter removal 400 (Referring to FIG. 4) in preserving the jump and smoothing all other values leading up to the jump may improve.

It should be noted that nBuf may be a parameter that may define what may be considered "coherent". For example, where there is a jump to a small group of isolated values along a different baseline, relatively large nBuf values may cause the group of isolated value to be flagged as outliers 500 (Referring to FIG. 5). Smaller values may cause the group of values to be seen as "coherent", and the method may attempt to preserve the jumps.

FIGS. 10A-10D illustrate the effect of jitter removal 400 (Referring to FIG. 4) rejection tolerance parameter (tolSmooth) on the filtered values. In FIG. 10A, tolSmooth=0.005. In FIG. 10B, tolSmooth=0.02. In FIG. 10C, tolSmooth=0.08. In FIG. 10D, tolSmooth=0.32. FIGS. 10A-10D shows the effect of increasing jitter removal 400 (Referring to FIG. 4) rejection tolerance parameters. As one increases the tolerance, jitter removal 400 may interpret the magnitude of the jump to be due to random jitter, leading to the same problem of filtering through real signal structure that standard filters have, as illustrated in FIGS. 10C and 10D. In addition to jitter removal 400, outlier rejection 300 may further be used to filter recorded signals.

For example, FIGS. 11A-11C illustrate an effect of outlier rejection 300 parameter (tolOutlier) on the filtered values. In FIG. 11A, tolOutlier=0.02. In FIG. 11B, tolOutlier=0.08. In FIG. 11C, tolOutlier=0.32. FIG. 11A-11C shows three different outlier rejection 300 tests. From the top down, first test 1100 is a progressively diverging trend (from the baseline) until there is a large jump and switch in polarity to a converging trend. Second test 1102 is a single jump of small magnitude to a single value. Third test 1104 is a larger jump to a group of values. All of these jumps are correctly flagged as outliers 500, referring to FIG. 5. However, as the tolerance increases, these jumps are progressively permitted in the final filtered values. For the middle single value at about value 190, that is a jump of 10, which is a variation of 5%. The tolOutlier of 0.08 (8%) permits that 5% variation.

Figure 12:
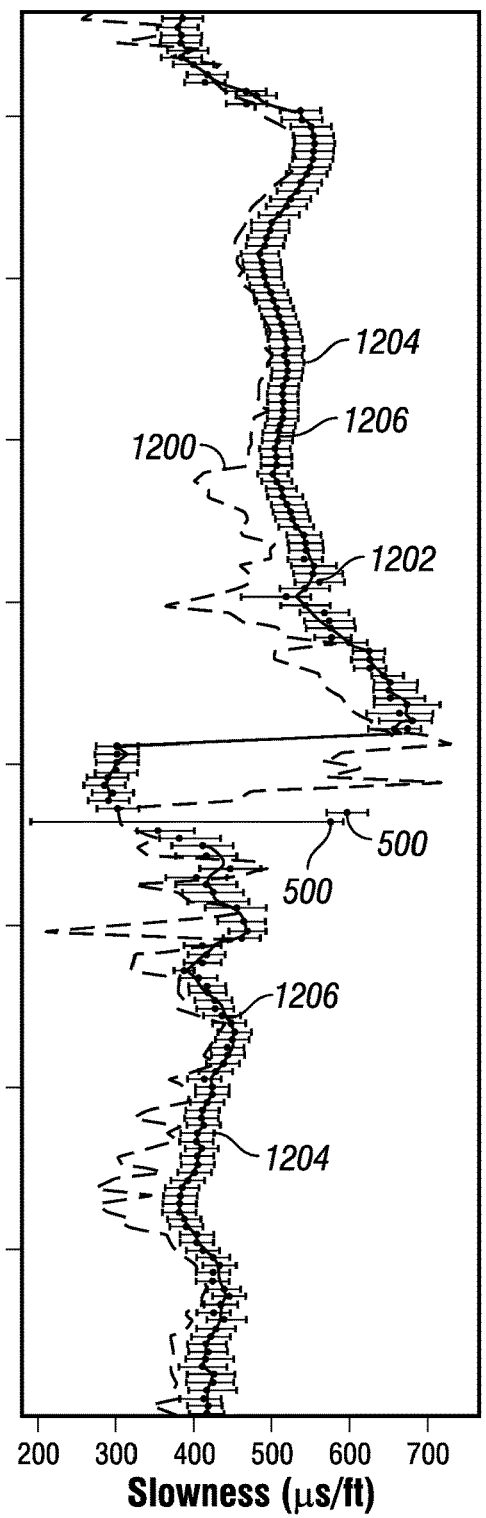
FIG. 12 illustrates an application to a well log where smoothing is performed.

The proposed outlier rejection 300 (Referring to FIG. 3) and jitter removal 400 (Referring to FIG. 4) has been tested on well log data. FIG. 12 shows two sonic logs. The x axis is slowness in microseconds per foot. The y axis is depth. Curve 1200 provides a reference for comparison purposes. There are issues with these reference values that are well known. Dots 1202 are the raw slowness values. Lines 1204 are error bars that quantify the relative uncertainty in the raw slowness values. Curve 1206 shows the filtered values. FIG. 12 illustrates application to log where smoothing may be performed. As may be observed, small variations ("jitter") throughout most of the data series may not be preserved in the filtered values. Two outliers 500 (Referring to FIG. 500) that are flagged as outliers 500 and not included in the filtered data values may be visible. Finally, a sudden jump in the baseline may be preserved without being modified by the filter.

The running-window method may be adaptive in that it may adapt its filtering method to the local data, permitting both filtering of random noise (due to jitter or jumps to isolated outliers) and preservation of rapid changes in real signal. This is a challenge that is not accomplished with traditional methods such as FIR or IIR filters or running smoothing filters.

Figure 5C:
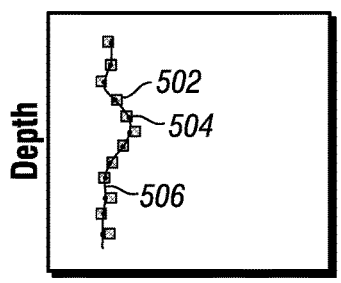

The outlier rejection 300 (Referring to FIG. 3) may robustly reject outliers 500 (Referring to FIG. 5). Outlier rejection 300 may be more effective at flagging outliers 500 than traditional methods that use a curve-fitting method to predict the observed data, then comparing those predictions to the observed data. This is because outlier rejection 300 uses a prediction "baseline" that has outliers already removed, whereas with the traditional method, outliers 500 may affect the calculation and consequently bias the predicted baseline. Outlier rejection 300 is a centered-buffer approach, which contains information about the past and future to make the best decision about how to filter the current data point. Outlier rejection 300 also does not suffer from edge effects that end-buffer approaches sometimes may exhibit.

This disclosure may provide a generic method for use on data series that exhibit noise issues, in real time or post processing. This disclosure may identify coherent and incoherent data variations, and only remove the incoherent variations. This disclosure may provide a new filtered data series that may be of higher quality and reliability than the raw data series. This disclosure may potentially improve subsequent, higher-level, interpretation data products that depend on potentially noisy data series for input. For example, integrated petrophysical calculations that use sonic logs for inputs may be improved by first using this disclosure on the input sonic logs.

This method and system may include any of the various features of the compositions, methods, and system disclosed herein, including one or more of the following statements.

Statement 1: A method for downhole signal filtering comprising: disposing a downhole tool into a wellbore; broadcasting a plurality of signals from a transmitter; recording the plurality of signals with a receiver to provide a data series; providing bounds for the data series; determining an outlier in the data series from the bounds; computing a difference in the data series between adjacent pairs of values; comparing the adjacent pairs of values to other values in the data series in a same window of the data series; determining if the adjacent pairs of values vary more than the threshold; filtering the data series, the filtering comprising removing the outliers from the data series to produce a filtered data series.

Statement 2: The method of statement 1, wherein the providing bounds comprises a tolerance parameter and a window size.

Statement 3: The method of statement 1 or statement 2, wherein the determining if the adjacent pairs of values vary more than a threshold comprises assigning a 2D flag array a value of 0 if the adjacent pairs of values vary more than the threshold.

Statement 4: The method of any preceding statement, wherein the determining if the adjacent pairs of values vary more than the threshold computing a 75% percentile distribution for each adjacent pair of values to determine if each adjacent pair of values are the outliers.

Statement 5: The method of any preceding statement, further comprising determining final outliers.

Statement 6: A method for downhole signal filtering comprising: disposing a downhole tool into a wellbore; broadcasting a plurality of signals from a transmitter; recording the plurality of signals with a receiver to provide a data series providing bounds for the data series; splitting a window comprising the data series into two halves; predicting a value at a center of a buffer with a half of the window comprising the data series; comparing observed and predicted values in the window against a threshold; comparing two different prediction values in the window; and determining a filtered value for the data series.

Statement 7: The method of statement 6, wherein the providing bounds comprises a tolerance value and a length of data window.

Statement 8: The method of statement 6 or statement 7, wherein the determining a filtered value comprises averaging the two different prediction values.

Statement 9: The method of statement 6-8, wherein the determining a filtered value comprises identifying if the two different prediction values are within a predetermined threshold to an observed value.

Statement 10: The method of statement 6-9, wherein a smooth threshold is determined from a relative tolerance value.

Statement 11: A well measurement system for downhole signal filtering comprising: a downhole tool, wherein the downhole tool comprises: a receiver; and a transmitter; a conveyance, wherein the conveyance is attached to the downhole tool; and an information handling system, wherein the information handling system is configured to broadcast a plurality of signals from a transmitter, record the plurality of signals with a receiver to provide a data series; provide bounds for the data series, determine an outlier for the data series from the bounds, compute a difference in the data series between adjacent pairs of values, compare the adjacent pairs of values to other values in the data series in a same window of the data series, determine if the adjacent pairs of values vary more than the threshold, filter the data series, the filtering comprising removing the outliers form the data series to produce a filtered data series.

Statement 12: The well measurement system for downhole signal filtering of statement 11, wherein the provide bounds comprises a tolerance parameter and a window size.

Statement 13: The well measurement system for downhole signal filtering of statement 11 or statement 12, wherein the determine if the adjacent pairs of values vary more than a threshold comprises assigning a 2D flag array a value of 0 if the adjacent pairs of values vary more than the threshold.

Statement 14: The well measurement system for downhole signal filtering of statement 11-13, wherein the determine if the adjacent pairs of values vary more than the threshold computing a 75% percentile distribution for each adjacent pair of values to determine if each adjacent pair of values are an outlier.

Statement 15: The well measurement system for downhole signal filtering of statement 11-14, wherein the information handling system is further operable determine final outliers.

Statement 16: The well measurement system for downhole signal filtering of statement 11-15, wherein the information handling system is further operable to: provide bounds; split a window comprising the plurality of signals into two halves; predict a value at a center of a buffer with each half; compare observed and predicted values against a threshold; compare two different prediction values; and determine a filtered value.

Statement 17: The well measurement system for downhole signal filtering of statement 11-16, wherein the provide bounds comprises a tolerance value and a length of data window.

Statement 18: The well measurement system for downhole signal filtering of statement 11-17, wherein the determine a filtered value comprises an average of the two different prediction values.

Statement 19: The well measurement system for downhole signal filtering of statement 11-18, wherein the determine a filtered value comprises an identify if the two different prediction values are within a predetermined threshold to an observed value.

Statement 20: The well measurement system for downhole signal filtering of statement 11-19, wherein a smooth threshold is determined from a relative tolerance value.

The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only, and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A method for downhole signal filtering comprising:
    disposing a downhole tool into a wellbore, wherein the downhole tool comprises:
        a transmitter configured to broadcast a plurality of signals; and
        a receiver configured to record the plurality of signals;
    broadcasting the plurality of signals from a transmitter;
    recording the plurality of signals with a receiver to provide a data series;
    providing bounds for the data series;
    determining one or more outliers in the data series from the bounds;
    computing a difference in the data series between adjacent pairs of values;
    comparing the adjacent pairs of values to other values in the data series;
    determining a difference between the adjacent pairs of values; and
    filtering the data series, the filtering comprising removing the one or more outliers from the data series to produce a filtered data series.

2. The method of claim 1, wherein the providing bounds for the data series further comprises identifying a tolerance parameter and identifying a window size.

3. The method of claim 1, wherein the determining a difference between the adjacent pairs of values comprises assigning a 2D flag array a value of 0 if the adjacent pairs of values vary more than an assigned threshold.

4. The method of claim 3, wherein the determining a difference between the adjacent pairs of values comprises evaluating a 75% percentile distribution for each adjacent pair of values to determine if each adjacent pair of values are the one or more outliers.

5. The method of claim 4, further comprising determining final outliers.

6. A method for downhole signal filtering comprising:
    disposing a downhole tool into a wellbore, wherein the downhole tool comprises:
        a transmitter configured to acoustically broadcast a plurality of signals; and
        a receiver configured to record the plurality of signals;
    broadcasting the plurality of signals from the transmitter;
    recording the plurality of signals with a receiver to provide a data series;
    providing bounds for the data series;
    splitting a window comprising the data series into two halves;
    predicting a value at a center of a buffer with a half of the window comprising the data series;
    comparing observed and predicted values in the window against a threshold;
    comparing two different prediction values in the window; and
    determining a filtered value for the data series.

7. The method of claim 6 wherein the providing bounds comprises a tolerance value and a length of data window.

8. The method of claim 6, wherein the determining a filtered value comprises averaging the two different prediction values.

9. The method of claim 6, wherein the determining a filtered value comprises identifying if the two different prediction values are within a predetermined threshold to an observed value.

10. The method of claim 6, wherein a smooth threshold is determined from a relative tolerance value.

11. A well measurement system for downhole signal filtering comprising:
a downhole tool, wherein the downhole tool comprises:
 a receiver; and
 a transmitter;
a conveyance, wherein the conveyance is attached to the downhole tool; and
an information handling system, wherein the information handling system is configured to broadcast a plurality of signals from a transmitter, record the plurality of signals with a receiver to provide a data series; provide bounds for the data series, determine one or more outliers for the data series from the bounds, compute a difference in the data series between adjacent pairs of values, compare the adjacent pairs of values to other values in the data series in a same window of the data series, determine a difference between the adjacent pairs of values, filter the data series, the filtering comprising removing the one or more outliers form the data series to produce a filtered data series.

12. The well measurement system for downhole signal filtering of claim 11, wherein the provide bounds for the data series further comprises a tolerance parameter and a window size.

13. The well measurement system for downhole signal filtering of claim 11, wherein the determine a difference between the adjacent pairs of values further comprises assigning a 2D flag array a value of 0 if the adjacent pairs of values vary more than an assigned threshold.

14. The well measurement system for downhole signal filtering of claim 13, wherein the determine a difference between the adjacent pairs of values further comprises evaluating a 75% percentile distribution for each adjacent pair of values to determine if each adjacent pair of values are the one or more outliers.

15. The well measurement system for downhole signal filtering of claim 14, wherein the information handling system is further operable to determine final outliers.

16. The well measurement system for downhole signal filtering of claim 11, wherein the information handling system is further operable to:
provide bounds;
split a window comprising the plurality of signals into two halves;
predict a value at a center of a buffer with each half;
compare observed and predicted values against a threshold;
compare two different prediction values; and
determine a filtered value.

17. The well measurement system for downhole signal filtering of claim 16, wherein the provide bounds comprises a tolerance value and a length of data window.

18. The well measurement system for downhole signal filtering of claim 16, wherein the information handling system is further configured to average the two different prediction values.

19. The well measurement system for downhole signal filtering of claim 16, wherein the information handling system is further configured to identify if the two different prediction values are within a predetermined threshold to an observed value.

20. The well measurement system for downhole signal filtering of claim 16, wherein a smooth threshold is determined from a relative tolerance value.

* * * * *